United States Patent [19]
Nielsen

[11] Patent Number: 5,284,196
[45] Date of Patent: Feb. 8, 1994

[54] TIRE CHAIN TIGHTENING APPARATUS

[76] Inventor: Charles R. Nielsen, P.O. Box 859, Lovelock, Nev. 89419

[21] Appl. No.: 29,717

[22] Filed: Mar. 11, 1993

[51] Int. Cl.⁵ ............................................. B60C 27/12
[52] U.S. Cl. ................................... 152/216; 152/218; 152/208; 152/241
[58] Field of Search ............... 152/213 R, 213 A, 208, 152/216, 217, 218, 239, 241; 81/15.8

[56] References Cited

U.S. PATENT DOCUMENTS

| | | | |
|---|---|---|---|
| 1,456,412 | 5/1923 | Watt, Jr. | 152/218 |
| 1,534,284 | 4/1925 | Pelletier | 81/15.8 |
| 3,031,000 | 4/1962 | Sebena | 152/218 |
| 3,336,064 | 8/1967 | Dzaack | 152/208 |
| 3,893,501 | 7/1975 | Brummer et al. | 152/218 X |

*Primary Examiner*—Michael W. Ball
*Assistant Examiner*—Francis J. Lorin
*Attorney, Agent, or Firm*—S. Michael Bender

[57] ABSTRACT

A new and improved apparatus for tightening a chain installed on a tire that is mounted on a wheel of a motor vehicle includes a hub assembly and a plurality of tension assemblies. Each tension assembly includes a first end for connecting to the hub assembly, a tensioning element connected to the first end, and a second end connected to the tensioning element. The second end is connected to a portion of the chain, such that the hub assembly and the tension assemblies exert tension on the chain in a radial direction toward the hub assembly. More specifically, the tension assemblies are attached to the hub assembly and the chain in pairs, and the tension assemblies of each pair are arranged in opposed relation. That is, the first ends of each pair are in opposed relation with respect to the hub assembly, and the second ends of each pair are in opposed relation with respect to the chain. At least one of the tension assemblies further includes a threaded shaft movable within a sleeve. The hub assembly contains a quantity of a de-icer liquid which is dispensed through a portion of the sleeve. A metering valve connected to the threaded shaft allows the metering of the de-icer liquid to be adjusted.

8 Claims, 4 Drawing Sheets

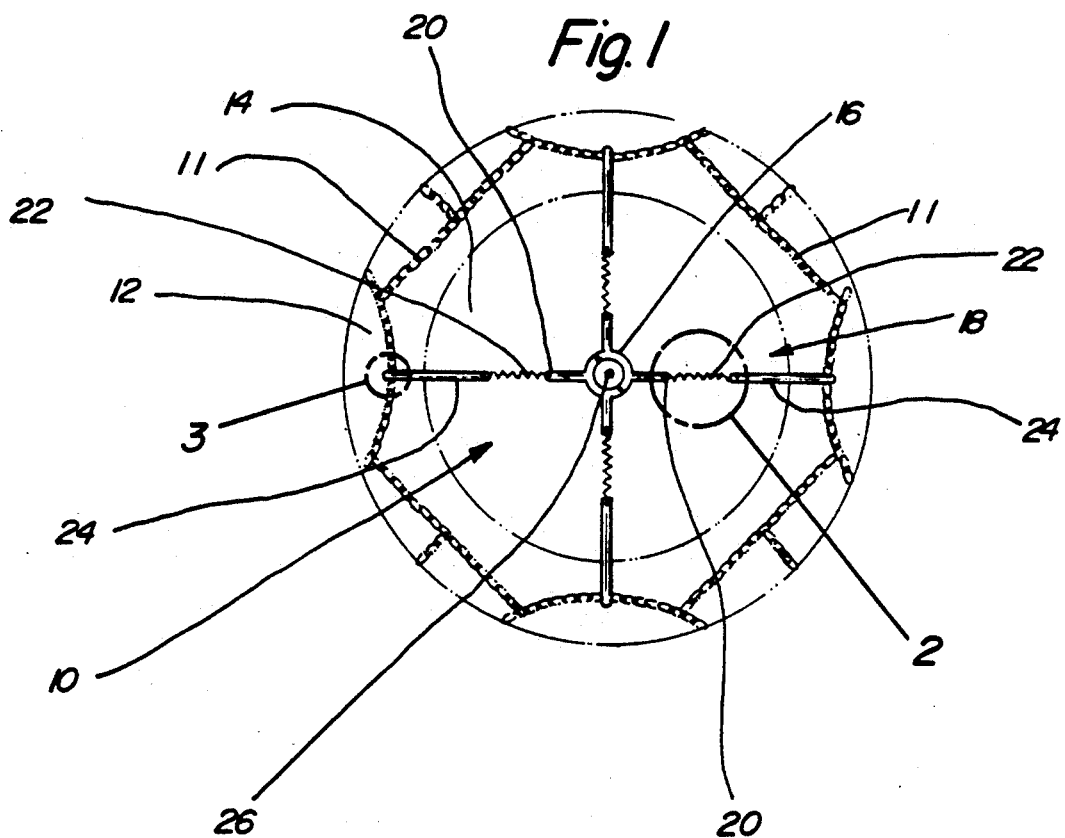
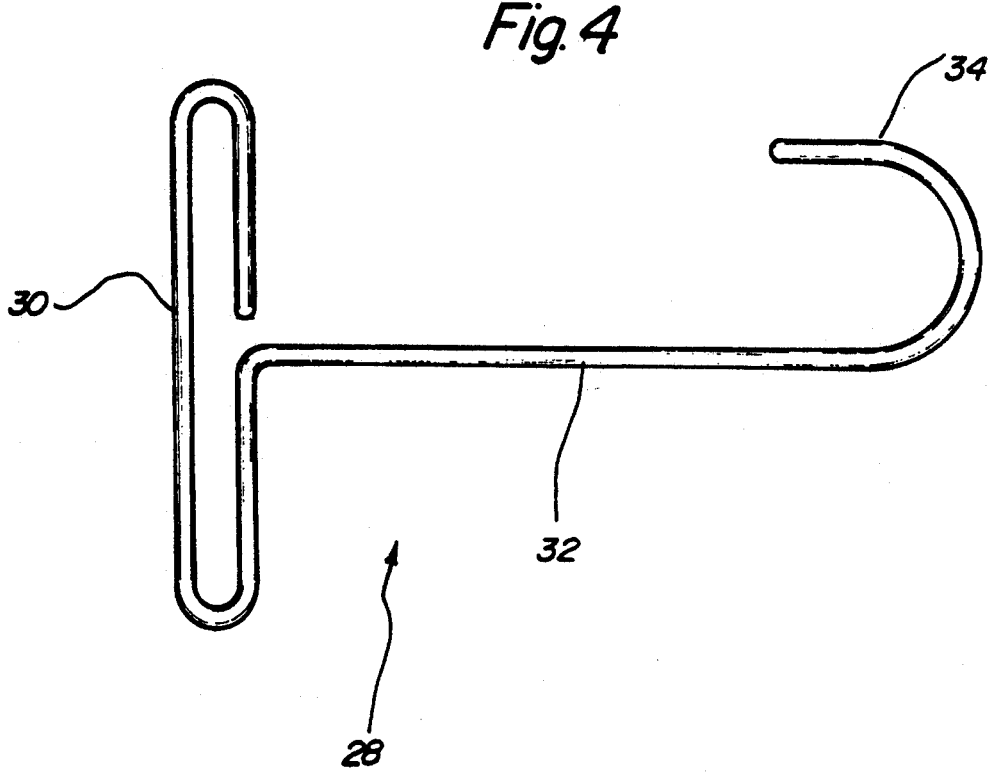

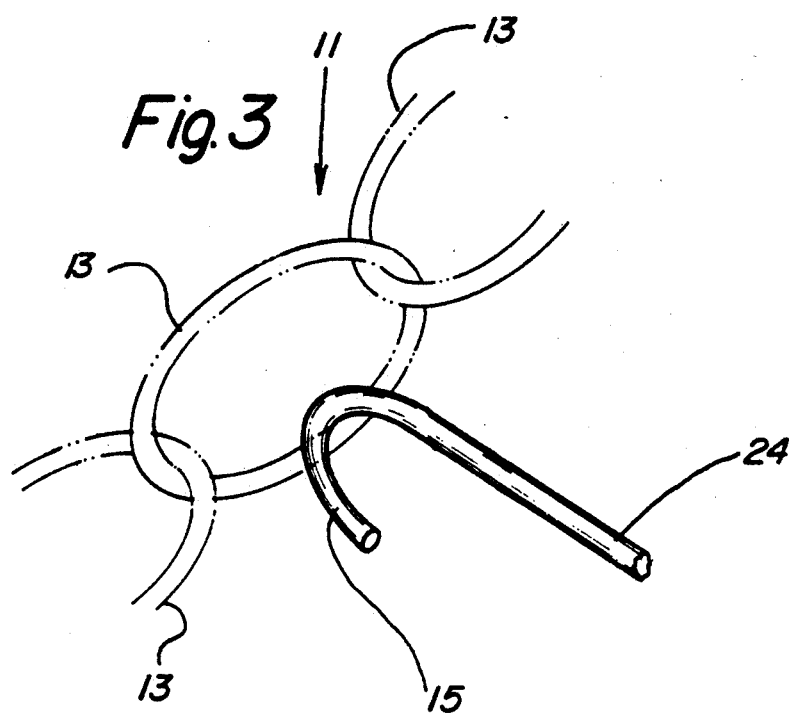
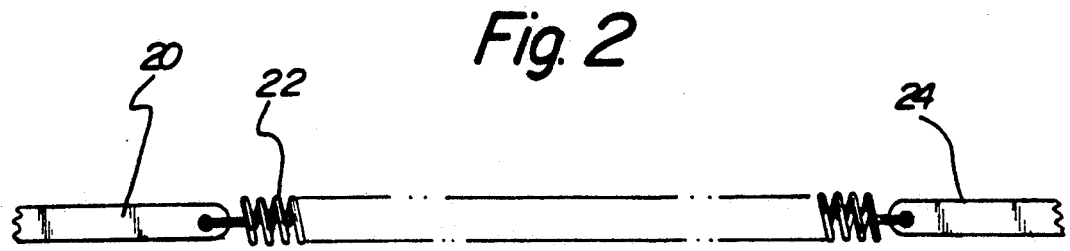

TIRE CHAIN TIGHTENING APPARATUS

BACKGROUND OF THE INVENTION

1. Field of the Invention

The present invention relates generally to an apparatus for tightening chains placed on motor vehicle tires, and more particularly, to an apparatus especially adapted to provide an automatic chain-tightening effect as the chains are in service on the vehicle.

2. Description of the Prior Art

During ice or snow conditions, chains are often installed on motor vehicle tires to increase traction. A problem often associated with the chains is that they may have a lot of slack and may be quite loose after they are installed. Some devices are known in the prior art to increase chain tension. For example, U.S. Pat. No. 3,888,290 of Hess et al discloses a tire chain tightener that employs a special cam between adjacent chain links to shorten the effect length of the chain. With such a device, the tightness of the chain must be manually adjusted periodically to adjust for chain wear and tire wear. It would be desirable, however, if a chain tightening device were provided that automatically tightened the chain as the chain and tire wear.

U.S. Pat. No. 4,130,155 of Barnett et al discloses a self-tightening connector for tire chains. This device is installed between chain links for automatically tightening the chain as the tire on the vehicle turns. U.S. Pat. No. 4,142,808 of Muller et al and U.S. Pat. No. 4,306,602 of Nestlen disclose other chain tightening devices that are installed between adjacent chain links. A problem associated with chain tighteners that are installed between adjacent chain links is that extra weight is added to the chain at certain locations on the chain, and the weight distribution around the chain becomes uneven. And when the weight distribution around the chain is uneven, the wheel becomes out of balance. It would be desirable, therefore, if a chain tightening apparatus were provided which tightened the chain without creating an uneven weight distribution on the wheel causing the wheel to become out of balance.

It may be of interest that another type of chain tightener, that cannot ride on the wheel with the chains, uses a hydraulic chain spreader to tighten the chain.

A number of problems are specifically associated with motor vehicle chains that are loose. One such problem is chain roll which occurs when loose portions of the chain bunch up and create their own rolling action. Such rolling action can lead to gouging of the tires. Also, when the chains are too loose, they may fly up and do damage to fenders on the motor vehicle. In these respects, it would be desirable if a chain tightener were provided which prevented chain bunch up. Moreover, it would be desirable if a chain tightener prevented loose chains from causing tire gouging and fender damage.

Thus, while the foregoing body of prior art indicates it to be well known to use chain tighteners for motor vehicle tire chains, the prior art described above does not teach or suggest a device that automatically tightens the chain as the chain and tire wear and that does not create an uneven weight distribution on the tire and wheel causing the wheel to become out of balance. The prior art does not provide a chain tightener prevents chain bunch up. In addition, the prior art does not provide a chain tightener that prevents loose chains from causing tire gouging and fender damage. The foregoing disadvantages are overcome by the unique tire chain tightening apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved apparatus for tightening chains installed on a tire that is mounted on a wheel of a motor vehicle. The apparatus includes a hub assembly and a plurality of tension assemblies. Each tension assembly includes a first end for connecting to the hub assembly, a tensioning element connected to the first end, and a second end connected to the tensioning element. The second end is connected to a portion of the chains, such that the hub assembly and the tension assemblies exert tension on the chains in a radial direction toward the hub assembly. More specifically, the tension assemblies are attached to the hub assembly and the chains in pairs, and the pairs of tension assemblies are arranged in opposed relation. That is, the first ends of each pair are in opposed relation with respect to the hub assembly, and the second ends of each pair are in opposed relation with respect to the chains. The tensioning elements may be comprised of helical springs. The second ends of the tension assemblies may include hooked ends for connection with links of the chains. Preferably, the hub assembly is positioned on the wheel in a position in close proximity to the rotational center of the wheel.

A hand-held tool is provided for installing the second ends of the tension assemblies on links of the chains. The installation tool includes a handle, a shank portion extending from the handle, and a hooked end extending from the shank portion. For installing the apparatus on the chains, the handle of the hand-held tool is grasped by a person, the hooked end is hooked onto a second end of a tension assembly, and the second end is pulled by the person to pass the second end over a link on the chains. The pulling action exerted by the person causes tension to be exerted by the tensioning element of the tension assembly against pulling tension exerted by the person. The second end of the tension assembly is permitted to engage the link, and the hooked end of the tool is unhooked from the second end thereby permitting the tension assembly to exert a pulling tension on the chains.

An adjustment assembly, attached to the hub assembly, may be provided for adjusting tension on a tensioning element. The adjustment assembly may include a threaded shaft connected to a first end of a tension assembly and a complementarily threaded nut located on the threaded shaft. The threaded nut is retained in a nut-receiving slot in the hub assembly, such that when the threaded nut is rotated around the threaded shaft, the nut-receiving slot retains the threaded nut in a stationary location with respect to longitudinal motion in the hub assembly, and the threaded shaft moves longitudinally with respect to the hub assembly, whereby tension on the tensioning element is adjusted.

The hub assembly may also include a container portion for containing a quantity of de-icer liquid and a dispenser conduit connected to the container portion, for dispensing de-icer liquid out from the container portion. A metering valve may be located in the dispenser conduit and may be used for metering the dispensing of the de-icer liquid out from the container portion. The metering valve may be controlled by the threaded shaft of the adjustment assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved tire chain tightening apparatus which has all of the advantages of the prior art and none of the disadvantages.

It is another object of the present invention to provide a new and improved tire chain tightening apparatus which may be easily and efficiently manufactured and marketed.

It is a further object of the present invention to provide a new and improved tire chain tightening apparatus which is of durable and reliable construction.

An even further object of the present invention is to provide a new and improved tire chain tightening apparatus which is susceptible of a low cost of manufacture with regard to both materials and labor, and which accordingly is then susceptible of low prices of sale to the consuming public, thereby making such tire chain tightening apparatus available to the buying public.

Still yet a further object of the present invention is to provide a new and improved tire chain tightening apparatus that automatically tightens the chain as the chain and tire wear.

Still another object of the present invention is to provide a new and improved tire chain tightening apparatus which tightens the chain without creating an uneven weight distribution on the wheel causing the wheel to become out of balance.

Yet another object of the present invention is to provide a new and improved tire chain tightening apparatus the prevents chain bunch up.

Even another object of the present invention is to provide a new and improved tire chain tightening apparatus that prevents loose chains from causing tire gouging and fender damage.

Still another object of the present invention is to provide a new and improved tire chain tightening apparatus that provides for adjustable tension on tension assemblies.

Still another object of the present invention is to provide a new and improved tire chain tightening apparatus that includes means for dispensing a de-icer liquid.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first preferred embodiment of the tire chain tightening apparatus of the invention installed on a motor vehicle tire.

FIG. 2 is an enlarged view of the circled area 2 in FIG. 1 showing a spring that exerts constant tension of the motor vehicle tire chains.

FIG. 3 is an enlarged view of the circled area 3 in FIG. 1 showing a hook end of the tire chain tightening apparatus of the invention in engagement with a tire chain.

FIG. 4 is a plan view of a tool for applying the embodiment of the tire chain tightening apparatus of the invention shown in FIG. 1 to a set of chains installed on a motor vehicle tire.

DESCRIPTION OF THE PREFERRED EMBODIMENT

Figure 5:
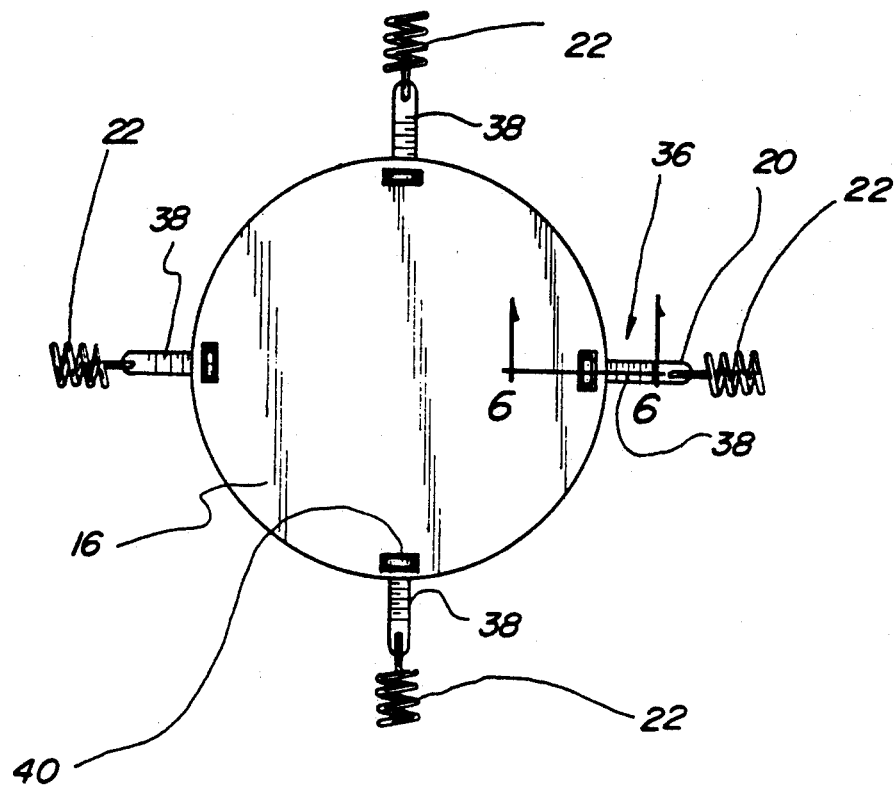
FIG. 5 is a partial plan view of a second embodiment of the tire chain tightening apparatus of the invention which includes springs with adjustable tension.

With reference to the drawings, a new and improved tire chain tightening apparatus 10 embodying the principles and concepts of the present invention will be described.

Turning initially to FIGS. 1-3, there is shown a first exemplary embodiment of the tire chain tightening apparatus of the invention 10 for tightening chains 11 installed on a tire 12 that is mounted on a wheel 14 of a motor vehicle. The apparatus 10 includes a hub assembly 16 and a plurality of tension assemblies 18 which include a first end 20 for connecting to the hub assembly 16, a tensioning element 22 connected to the first end 20, and a second end 24 connected to the tensioning element 22. The second end 24 is connected to a portion of the chains 11, such that the hub assembly 16 and the tension assemblies 18 exert tension on the chain 11 in a radial direction toward the hub assembly 16.

The tension assemblies 18 are attached to the hub assembly 16 and the chains 11 in pairs. The pairs of tension assemblies 18 are arranged in opposed relation, such that the first ends 20 of each pair are in opposed relation with respect to the hub assembly 16; and the second ends 24 of each pair are in opposed relation with respect to the chains 11.

The tensioning elements 22 are comprised of helical springs 22. The second ends 24 of the tension assemblies 18 include hooked ends 15 for connection with links 13 of the chains 11. The hub assembly 16 is positioned on the wheel 14 in a position in close proximity to the rotational center 26 of the wheel 14.

The constant tension exerted by the arrangement of the hub assembly 16, the tension assemblies 18, and the chains 11 provides for automatic tightening of the chains as the chain and tire wear. Moreover, the radially directed tension on the chains prevents chain bunch up and prevents loose chains from causing tire gouging and fender damage. The arrangement of the tire chain tightening apparatus 10 of the invention on a tire 12 and wheel 14 provides that the weight of the apparatus 10 is distributed evenly around the tire 12 and wheel 14. In this way, the chains 11 are tightened without creating an uneven weight distribution on the wheel 14 causing the wheel 14 to become out of balance.

As shown in FIG. 4, a hand-held tool 28 is provided for installing the second ends 24 of the tension assemblies 18 on links 13 of the chains 11. The tool 28 includes a handle 30, a shank portion 32 extending from the handle 30, and a hooked end 34 extending from the shank portion 32. To install the apparatus 10 of the invention on the chains 11, the handle 30 of the handheld tool 28 is grasped by a person. The hooked end 34 of the tool 28 is hooked onto a second end 24 of a tension assembly 18. The second end 24 is pulled by the person to pass over a link 13 on the chains 11 whereby tension is exerted by the tensioning element 22 of the tension assembly 18 against the pulling by the person. The second end 24 is permitted to engage the link 13. Then, the hooked end 34 of the tool 28 is unhooked from the second end 24 of the tension assembly 18, and, thereby, the tension assembly 18 exerts a pulling tension on the chains 11.

Figure 6:
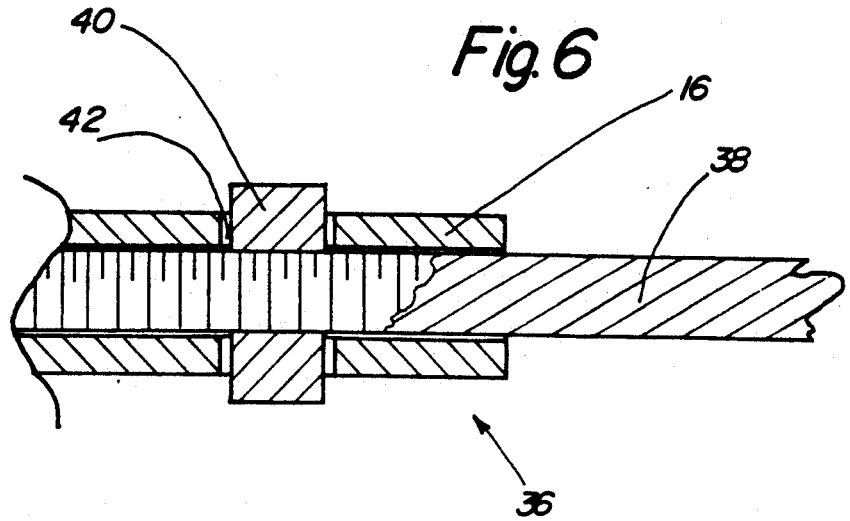
FIG. 6 is a cross-sectional view of the embodiment shown in FIG. 5 taken along the line 6—6 thereof.

Turning to FIGS. 5-6, a second embodiment of the invention of the tire chain tightening apparatus 10 is shown. Reference numerals are shown that correspond to like reference numerals that designate like elements shown in the other figures. In addition, an adjustment assembly 36 is attached to the hub assembly 16 for adjusting tension on a tensioning element 22. More specifically, the adjustment assembly 36 includes a threaded shaft 38 connected to a first end 20 of a tension assembly 18, and a complementarily threaded nut 40 located on the threaded shaft 38. The threaded nut 40 is retained in a nut-receiving slot 42 in the hub assembly 16. In operation, when the threaded nut 40 is rotated around the threaded shaft 38, the nut-receiving slot 42 retains the threaded nut 40 in a stationary location with respect to longitudinal motion in the hub assembly 16; and the threaded shaft 38 moves longitudinally with respect to the hub assembly 16. In this way, tension on the tensioning element 22 is adjusted. The terms "longitudinally" and "longitudinal" as used herein mean in a radial direction with respect to the wheel and tire central axis or rotational axis when the tire chain tightening apparatus 10 is installed thereon as described above and as shown in the drawings.

Figure 7:
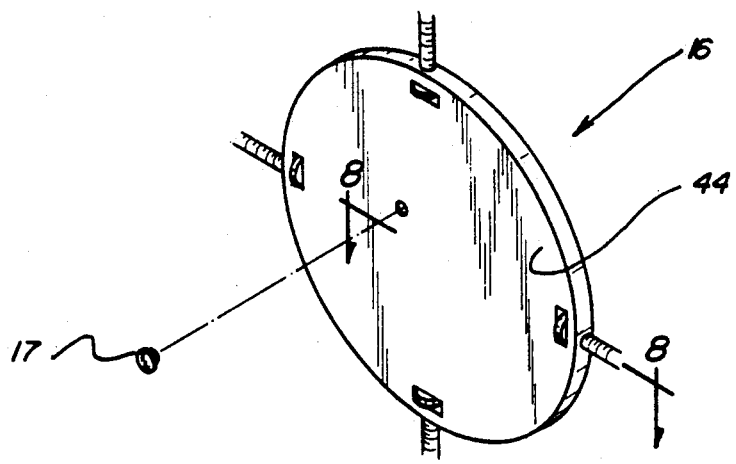
FIG. 7 is a partial perspective view of a third embodiment of the tire chain tightening apparatus of the invention which includes springs with adjustable tension and a rotatable dispenser for dispensing de-icer onto the road.
Figure 8:
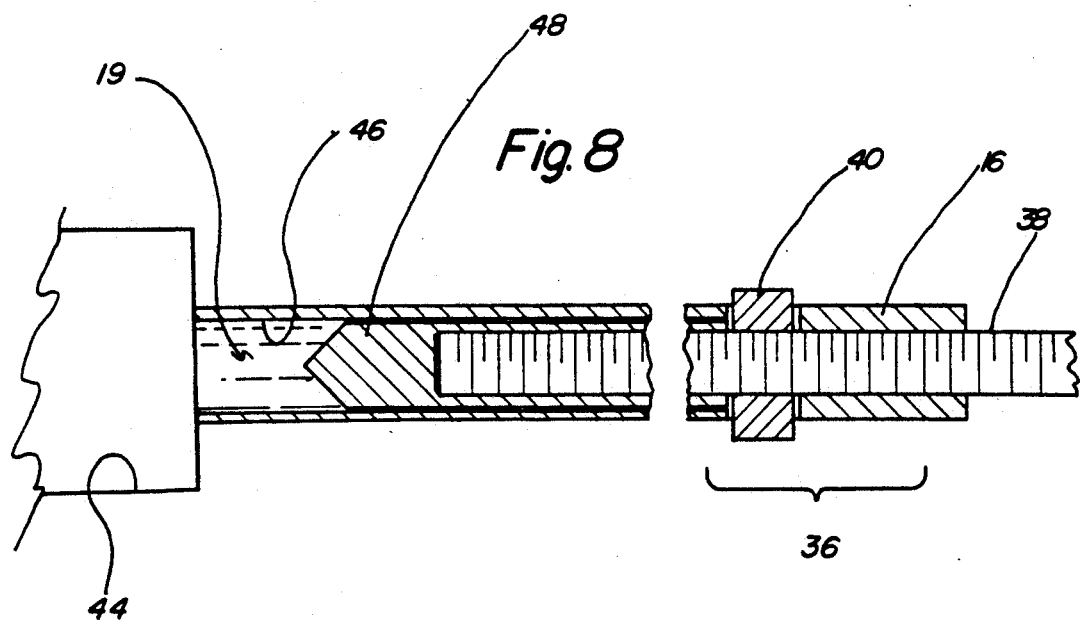
FIG. 8 is a cross-sectional view of the embodiment shown in FIG. 7 taken along the line 8—8 thereof.

Turning to FIGS. 7-8, a third embodiment of the invention is shown. Reference numerals are shown that correspond to like reference numerals that designate like elements shown in the other figures. In addition, the hub assembly 16 includes a container portion 44 for containing a quantity of de-icer liquid 19. A removable and replaceable filler cap 17 is provided to enable filling of the container portion 44 with de-icer liquid when needed. A dispenser conduit 46 is connected to the container portion 44 and is used for dispensing de-icer liquid 19 out from the container portion 44. A metering valve 48 is located in the dispenser conduit 46 and is used for metering the dispensing of the de-icer liquid 19 out from the container portion 44. The metering valve 48 is connected to the threaded shaft 38 of the adjustment assembly 36. Longitudinal movement of the threaded shaft 38 and the metering valve 48 causes more or less de-icer liquid to flow out from the container portion 44.

In operation, as the wheel 14 of the motor vehicle rotates, centrifugal force is created in the container portion 44 to urge a quantity of de-icer liquid through the dispenser conduit 46, past the metering valve 48, and onto the road surface.

The components that comprise the tire chain tightening apparatus of the invention may be made from tough, inexpensive metal materials. If desired, the metal parts can be plastic coated to inhibit rust formation and other corrosion. More specifically, the size and strength of the metal components will depend upon the size of the tire and the weight of the chains that are installed on the tire. The tire chain tightening apparatus of the invention can be used for cars, trucks, busses, semi-trucks and trailers, farm equipment, and heavy duty commercial equipment.

It is apparent from the above that the present invention accomplishes all of the objects set forth by providing a new and improved tire chain tightening apparatus that is low in cost, relatively simple in design and operation, and which may advantageously be used to automatically tighten the chains as the chains and tire wear.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. An apparatus for tightening a chain installed on a tire that is mounted on a wheel of a motor vehicle, the apparatus comprising:

a hub assembly, and a plurality of tension assemblies which include a first end for connecting to said hub assembly, a tensioning element connected to said first end, and a second end connected to said tensioning element, wherein said second end is connected to a portion of the chain, such that said hub assembly and said tension assemblies exert tension on the chain in a radial direction toward said hub assembly, at least one of said tension assemblies comprising a threaded shaft disposed for relative movement in a sleeve, wherein said hub assembly includes:

a container portion means for containing a quantity of de-icer liquid, dispenser conduit means, connected to said container portion means, for dispensing de-icer liquid out from said container portion means, said dispenser conduit forming a portion of said sleeve, and metering valve means, located in said dispenser conduit means, for metering the dispensing of the de-icer liquid out from said container portion means, and wherein said metering valve means is connected to a threaded shaft of a tension adjustment assembly for adjustment of said metering valve, said threaded shaft being disposed in said sleeve.

2. The apparatus described in claim 1 wherein:

said tension assemblies are attached to said hub assembly and to the chain portions in pairs, and said tension assemblies of each pair are arranged in opposed relation, such that first ends of each assembly are in opposed relation with respect to said hub assembly, and second ends of each assembly are in opposed relation with respect to the chain portions.

3. The apparatus described in claim 1 wherein said tensioning elements are comprised of helical springs.

4. The apparatus described in claim 1 wherein said second ends of said tension assemblies include hooked ends for connection with links of the chain.

5. The apparatus described in claim 1 wherein said hub assembly is positioned on the wheel in a position in close proximity to the rotational center of the wheel.

6. The apparatus described in claim 1, further including:

a hand-held tool for installing said second ends on links of the chain, wherein said tool includes a handle, a shank portion extending from said handle, and a hooked end extending from said shank portion, wherein, for installing the apparatus on the chain, said handle of said hand-held tool is grasped by a person, said hooked end is hooked onto a second end of a tension assembly, said second end is pulled by the person to pass over a link on the chain whereby tension is exerted by the tensioning element of the tension assembly against pulling by the person, said second end is permitted to engage the link, and the hooked end of the tool is unhooked from the second end thereby permitting the tension assembly to exert a pulling tension on the chain.

7. The apparatus described in claim 1, further including adjustment assembly means, attached to said hub assembly, for adjusting tension on at least one tensioning element.

8. The apparatus described in claim 7 wherein said adjustment assembly means includes:

a threaded shaft connected to a first end of said at least one tension assembly, and a complementarily threaded nut located on said threaded shaft, wherein said threaded nut is retained in a nut-receiving slot in said hub assembly, such that when said threaded nut is rotated around said threaded shaft, said nut-receiving slot retains said threaded nut in a stationary location with respect to longitudinal motion in said hub assembly, and said threaded shaft moves longitudinally with respect to said hub assembly, whereby tension on said tensioning element is adjusted.

* * * * *